Dec. 4, 1962   M. P. RIVERA   3,066,537
PRESSURE GAUGE
Filed July 24, 1958

INVENTOR
Michael P. Rivera
BY Dodge and Sons
ATTORNEYS

United States Patent Office 3,066,537
Patented Dec. 4, 1962

3,066,537
PRESSURE GAUGE
Michael P. Rivera, Haddonfield, N.J., assignor to The New York Air Brake Company, a corporation of New Jersey
Filed July 24, 1958, Ser. No. 750,613
5 Claims. (Cl. 73—399)

This invention relates to pressure gauges and more particularly to gauges of the hot wire type in which the temperature of the hot wire is indicative of the pressure of the gas surrounding the wire.

Gauges of this type are in common use today in high vacuum systems. In general, they comprise a gauge tube, an electric current supply circuit, and a temperature measuring circuit. The gauge tube consists of a sealed envelope communicating with the vacuum system, a heater filament, and a thermocouple for measuring the temperature of the filament. The measuring circuit includes a voltmeter connected across the output of the thermocouple. Current passing through the filament produces heat, and, within a pressure range of about 0.001 to 1.0 mm. of mercury, the rate of heat transfer from the filament to the gas is proportional to the pressure. As a result, the temperature of the filament, and therefore the output of the thermocouple, is a measure of the pressure of the gas.

In practice, it has been found that the characteristics of the heater filaments, i.e., resistance, diameter, length, etc., vary from tube to tube. Since the output of the thermocouple is a function of these characteristics, it is necessary to recalibrate the measuring circuit each time the gauge tube is replaced. In order to recalibrate the measuring circuit, the pressure in the gauge tube must be reduced below 0.001 mm. of mercury (the lower limit of the operating range of the gauge tube) so that a reference point can be established on the indicating scale of the voltmeter. Even if the users of these gauges possess the equipment necessary to establish a pressure as low as this, and many do not, still the recalibration of the circuit is a burden because of the time it requires. The burden is increased in those cases where a plurality of concurrent pressure measurements are desired because each tube requires either a different input current or a separate measuring circuit.

In copending application Serial No. 717,355, filed February 25, 1958, now Patent No. 3,021,712, and assigned to the same assignee as the present application, there is disclosed a method of compensating gauge tubes for variations in the characteristics of the heater filaments in which a compensating resistor, affording a prescribed resistance, is connected in parallel with the heater filament. While tubes compensated in this manner have performed satisfactorily, they do possess certain characteristics which limit their usefulness. In the first place, because the filament and resistor are connected in parallel, the gauge tube draws a large amount of current from the power supply section of the measuring system in which it is used. Because of this, it is impracticable to use a battery as the source of electrical energy in those cases where the tube is in continuous operation for extended periods of time. Furthermore, in those measuring systems employing a plurality of gauge tubes, only one tube can be connected with the power supply section at any one time because the current supplied to the parallel-connected filament and resistor must have a standard constant magnitude equal to the magnitude of the current used when each individual tube was compensated. This necessitates the use of a circuit for pre-warming those tubes which are in the standby condition, in order to reduce the time required for these tubes to reach operating temperature when they are subsequently connected into the measuring circuit.

The object of this invention is to provide a method of compensating gauge tubes for variations in the characteristic of the heater filaments which produces tubes that are free from the limiting traits mentioned above. According to the present invention, the tubes are compensated by connecting a variable resistor in series with the heater filament and applying a constant standard voltage across the series-connected filament and resistor. The pressure in the gauge tube is then reduced below 0.001 mm. of mercury and the resistance afforded by the resistor is varied until the output of the thermocouple produces full-scale deflection of the voltmeter. When this condition is attained, the resistance of the resistor is measured and a compensating resistor having that value is permanently connected in series with the filament of that tube. All tubes are compensated in the same manner, using the same standard voltage with the result that whenever equal voltages are applied to these compensated tubes, all of the thermocouples will have the same output regardless of the fact that the characteristics of the heater filaments are different.

Since the compensating resistors and heater filaments of the gauge tubes compensated by this method are connected in series, they draw considerably less current than their counterparts compensated by the method disclosed in the copending application referred to above. Thus tubes, compensated in this manner, can be used in systems employing batteries as sources of electrical energy. Further, since these compensated tubes operate on constant voltage rather than constant current, a plurality of such tubes, arranged in parallel, can be connected with the power supply section at the same time. Thus the need for pre-warming circuits is eliminated.

A preferred embodiment of the invention will now be described in detail having reference to the accompanying drawing, in which.

Figure 1:
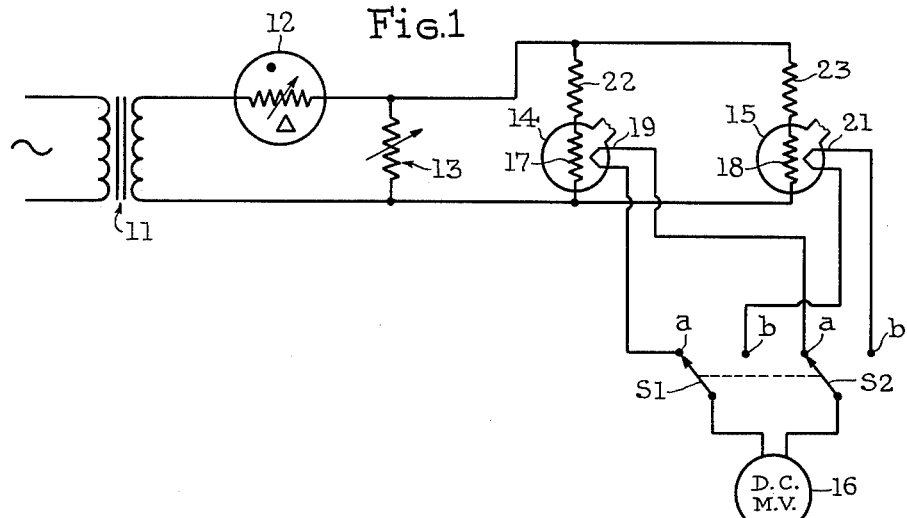
FIG. 1 is a wiring diagram of a pressure measuring system employing two compensated gauge tubes.

Referring to FIG. 1, the circuit comprises two basic sections, namely, a power supply section and a measuring and indicating section. The power supply section comprises an input transformer 11, a current regulating device or ballast tube 12, and a variable calibrating resistor 13. The ballast tube 12 is provided to correct for variations in the input voltage applied to transformer 11 and can be omitted if the transformer is connected with a constant voltage source. The measuring and indicating section of the circuit comprises switches S1 and S2, gauge tubes 14 and 15, and D.C. millivoltmeter 16. The gauge tubes contain heater filaments 17 and 18 which are connected in parallel with each other and with calibrating resistor 13, and thermocouples 19 and 21 which are connected through contacts $a$ and $b$, respectively, of switches S1 and S2 with the D.C. millivoltmeter 16. Compensating resistors 22 and 23 are connected in series with heater filaments 17 and 18, respectively, and these compensating resistors are so selected that the output voltage versus pressure curves of the two thermocouples 19 and 21 will be identical.

The circuit shown in FIG. 1 could be used in the process of compensating the gauge tubes but in the interests of clarity, this process will be described with reference to the simplified circuit shown in FIG. 2. The components of the FIG. 2 circuit bear the same numerals with prime designations as their FIG. 1 counterparts.

Figure 2:
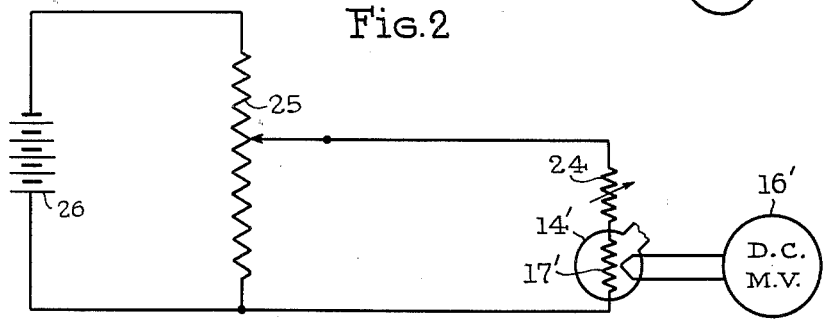
FIG. 2 is a simplified wiring diagram of a circuit used in the process of determining the resistances of the compensating resistors.
Figure 3:
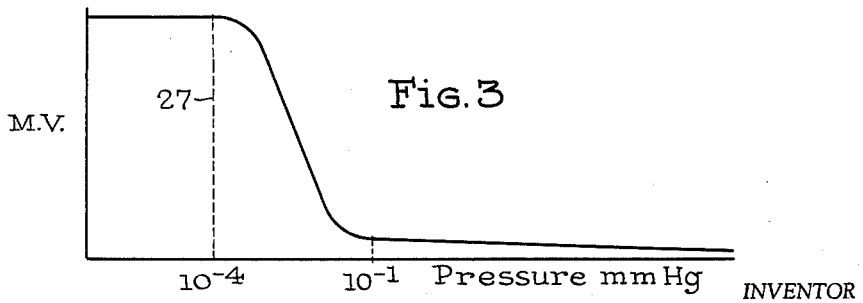
FIG. 3 is a graph showing the relationship between the output of the thermocouple and the pressure in the gauge tube.

As seen in FIG. 2, the heater filament 17' of gauge tube 14' is connected in series with adjustable resistor 24, a portion of the winding of potentiometer 25 and battery 26. The movable tap of the potentiometer is adjusted until a predetermined standard voltage is applied across adjustable resistor 24 and heater filament 17'. The pressure in the gauge tube is now reduced to $10^{-4}$ mm. of mercury (see line 27 in FIG. 3 which is below the operating range of the instrument). Variable resistor 24 is then adjusted until the pointer of millivoltmeter 16' registers full-scale deflection. The resistance afforded by adjustable resistor 24 is then measured and a compensating resistor having this resistance is permanently placed in series with gauge tube filament 17'.

Gauge tubes compensated in this manner are employed in the operation of the measuring system shown in FIG. 1. Calibrating resistor 13 is adjusted until the voltage applied across gauge tube filaments 17 and 18 and their series-connected compensating resistors 22 and 23 is the same as the predetermined standard voltage applied across filament 17' and series-connected resistor 24 during the compensation process. When the wipers of switches S1 and S2 are on their $a$ contacts, the pressure in gauge tube 14 will be read out on millivoltmenter 16. When these wipers are on their $b$ contacts, the pressure in gauge tube 15 will be indicated. It should be observed that since the voltage used in the measuring system is the same as the voltage used in the process of compensating each of the gauge tubes 14 and 15, the pressure in the two gauge tubes can be indicated on the same meter and this indication can be obtained without previously calibrating the meter. This is attributable to the fact that the compensation process results in the selection of compensating resistors which cause the thermocouples to have identical output ranges.

Since the total resistances of the various series-connected heater filaments and compensating resistors are not equal, it is necessary to adjust the output voltage of the power supply section each time a gauge tube is replaced. In order to reestablish the standard voltage, it is only necessary to adjust calibrating resistor 13. It is possible to provide a self-regulating voltage control for the power supply section but since the operating voltage is low (on the order of one volt) such a control would be complex and therefore expensive.

As stated previously, the drawings and description relate only to a preferred embodiment of the invention. Since many changes can be made in this embodiment without departing from the inventive concept, the following claims should provide the sole measure of the scope of the invention.

What is claimed is:

1. The method of compensating a vacuum gauge of the type in which the temperature of an electrical heater element is measured by a thermocouple and the output of the thermocouple is indicative of the pressure of the surrounding gas, comprising the steps of adjusting the pressure of the surrounding gas to a predetermined value; applying a constant electrical voltage to the heater element; placing a resistance in series with the heater element; and varying the magnitude of the resistance until the output of the thermocouple attains a predetermined value.

2. In combination, a source of electrical energy providing a standard voltage; a plurality of vacuum gauge tubes each including a sealed envelope having an inlet connection, an electrical heater element, and a thermocouple for measuring the temperature of said element; an electrical circuit connecting the heater elements in parallel with said source; and compensating resistors, one connected in series with each heater element, the resistances afforded by the resistors being such that the thermocouples have identical output ranges when said gauge tubes are exposed to the same ranges of pressure fluctuations.

3. The combination defined in claim 2 including a common meter for indicating the output of the thermocouples; and switching means for selectively connecting the meter with each of the thermocouples.

4. A plurality of vacuum gauge tubes, each comprising a sealed envelope having an inlet connection, an electrical heater element within each envelope, a thermocouple for measuring the temperature of each heater element, and a resistance connected in series with each heater element, the magnitudes of the resistances being such that the thermocouples have identical output ranges when said gauge tubes are exposed to the same ranges of pressure fluctuations.

5. The method of compensating a plurality of vacuum gauge tubes of the type wherein the temperature of an electrical heater element is measured by a thermocouple and the output of the thermocouple is indicative of the pressure of the surrounding gas, comprising the steps of subjecting each gauge tube to the same gas pressure; applying the same constant electrical voltage to the heater element of each tube while the tube is subjected to said gas pressure; and placing in series with the heater element of each tube a compensating resistance of such value that the outputs of the thermocouples are identical.

References Cited in the file of this patent
UNITED STATES PATENTS

| | | |
|---|---|---|
| 1,381,450 | Butterfield | June 14, 1921 |
| 2,315,671 | Tauney | Apr. 6, 1943 |